US006814286B2

(12) United States Patent
Cheung (10) Patent No.: US 6,814,286 B2
(45) Date of Patent: Nov. 9, 2004

(54) CARD FOR MULTI-PURPOSE USING (75) Inventor: Yau Sheung Cheung, Taipei (TW)

(73) Assignee: Medea International (Taiwan) Corporation, Taipei (TW)

( * ) Notice: Subject to any disclaimer, the term of this patent is extended or adjusted under 35 U.S.C. 154(b) by 124 days.

(21) Appl. No.: 10/015,571

(22) Filed: Dec. 17, 2001

(65) Prior Publication Data

US 2003/0111539 A1 Jun. 19, 2003

(51) Int. Cl.⁷ .................................................. G06K 7/00
(52) U.S. Cl. ...................... 235/440; 235/454; 235/449; 235/451; 235/487
(58) Field of Search ................................. 235/440, 454, 235/449, 451, 487

(56) References Cited

U.S. PATENT DOCUMENTS

| 5,513,749 | A | * | 5/1996 | Simmons | 206/308.1 |
| 5,558,220 | A | * | 9/1996 | Gartz | 206/308.1 |
| 5,584,089 | A | * | 12/1996 | Huang | 15/97.1 |
| 6,078,557 | A | * | 6/2000 | Pierson | 369/273 |
| 6,164,445 | A | * | 12/2000 | Cooper | 206/308.1 |
| 6,424,616 | B1 | * | 7/2002 | Al-Askari | 369/289 |
| 6,484,940 | B1 | * | 11/2002 | Dilday et al. | 235/454 |
| 6,513,709 | B1 | * | 2/2003 | Hansen | 235/380 |

* cited by examiner

Primary Examiner—Michael G. Lee
Assistant Examiner—Kimberly Nguyen
(74) Attorney, Agent, or Firm—Rosenberg, Klein & Lee (57) ABSTRACT

The present invention discloses a novel card for multi-purpose using, and more particularly, a card suitable for utilizing in a magnetic stripe card reader, an IC card reader and an optical driver to read out the data. The thickness (0.8 mm) of the card corresponds with to the specification of the ISO 7816. The card comprises a reading area of an optical disc, a magnetic stripe and an IC chip, and can be placed on a casing plate with a thickness of 0.4 mm so that the card for multi-purpose using combines the functions of a conventional dual mode (magnetic stripe/IC chip) card and a conventional optical disc, so as to achieve advantages such as convenience for magnetic stripe and IC chip reading and larger memory capacity asscessing.

11 Claims, 7 Drawing Sheets

CARD FOR MULTI-PURPOSE USING

BACKGROUND OF THE INVENTION

1. Field of the Invention

The present invention generally relates to a multi-functional card, and more particularly, to a card suitable for utilizing in a magnetic stripe card reader, an IC card reader, and an optical driver. Such card contains multi-functions of a magnetic stripe card, an IC card and an optical disc, thereby improving the convenience, memory capacity, security, and functionality.

2. Description of the Prior Art

Rapidly towards an information community, recently people have already entered a plastic card era. Every one holds, in his wallet, plenty of cards such as magnetic stripe cards and IC cards for finance management, identification, security, medical treatment and entrance guard purpose.

Figure 1A:
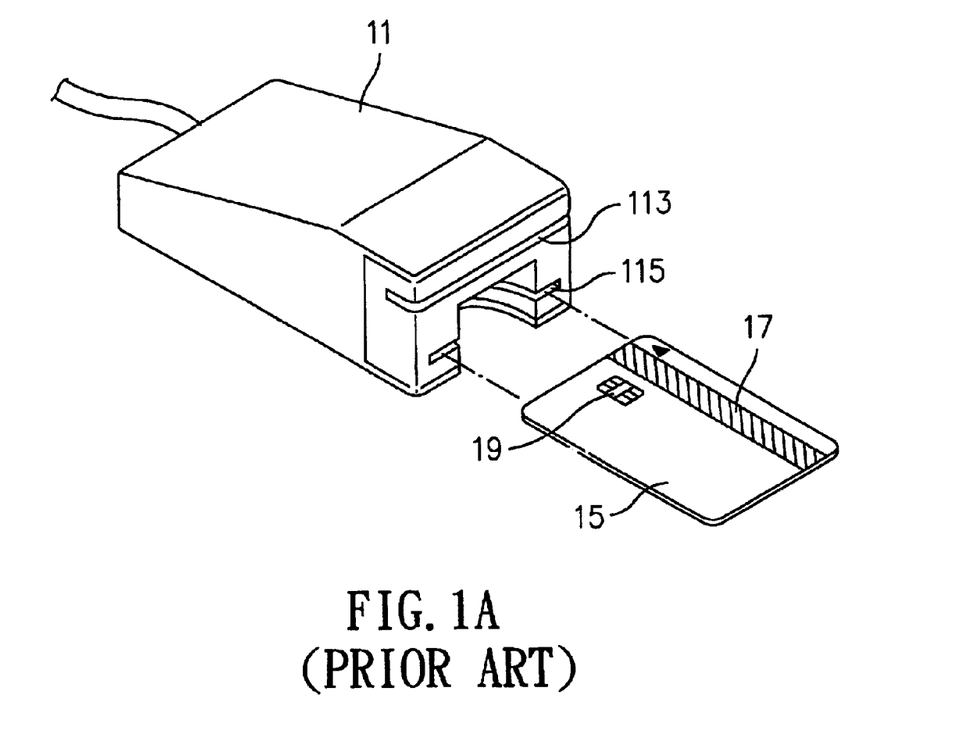
FIG. 1A and FIG. 1B represents a three-dimensional view and a cross-sectional view of a dual mode (IC chip/magnetic stripe) card, respectively, in accordance with the prior art.
Figure 1B:
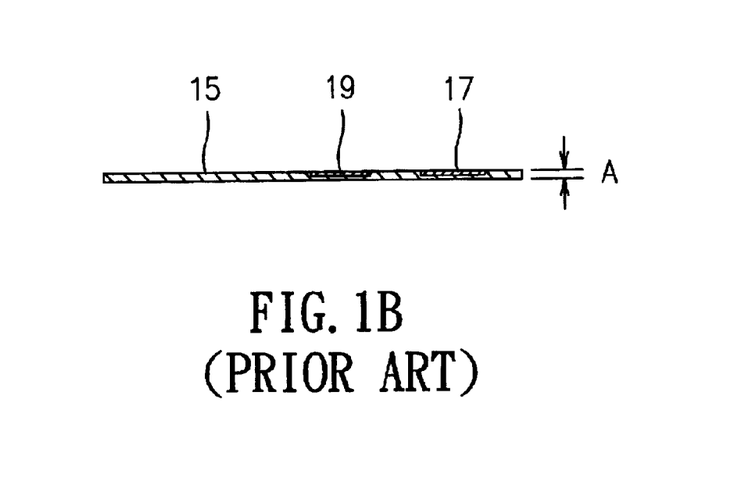

Please refer to FIG. 1A and FIG. 1B, which represent a three-dimensional view and a cross-sectional view of a dual mode (IC chip/magnetic stripe) card, respectively. The dual mode card 15 comprises a magnetic stripe 17 and an IC chip 19 formed on a plastic card according to International Standard ISO 7816 (85.6 mm×53.98 mm ×0.8 mm). "A" represents the thickness. The data stored in the magnetic stripe 17 or the IC chip 19 of the dual mode card 15 can be read through a wiping slot 113 or a socket 115 of a card reader 11.

The dual mode card 15 is convenient for its small size and portability. However, a magnetic stripe only has a memory capacity of 1.2K bytes and an IC chip on a conventional IC card only has a memory capacity of 250K bytes. It is obvious that such a dual mode card is limited in its memory size and is insufficient for the modern applications.

Figure 2A:
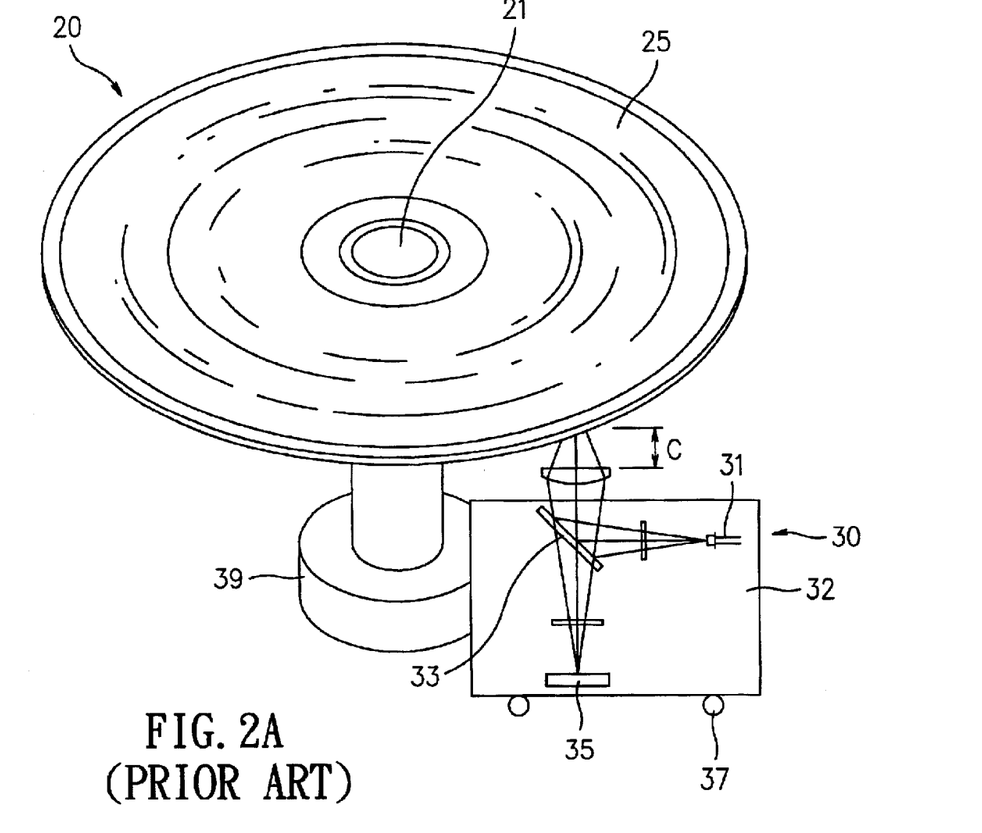
FIG. 2A and FIG. 2B represent a three-dimensional view and a cross-sectional view of a conventional optical disc, respectively, in accordance with the prior art.
Figure 2B:
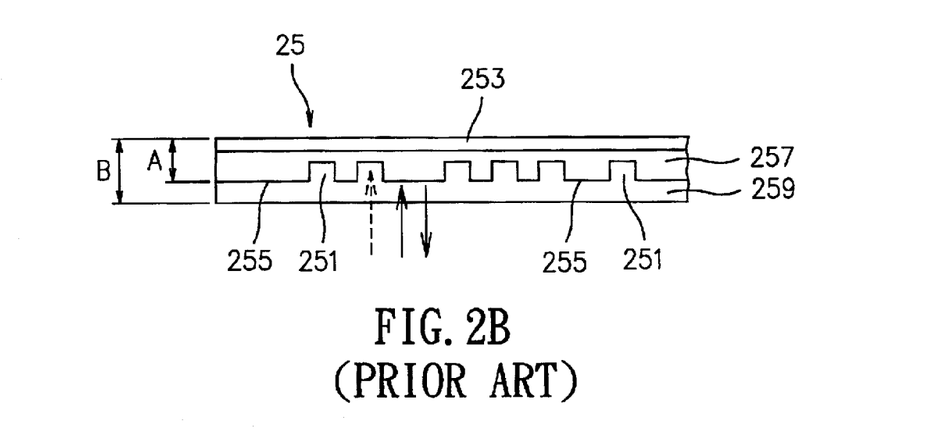

Please refer to FIG. 2A and FIG. 2B, which represent a three-dimensional view and a cross-sectional view of a conventional optical disc, respectively. According to Compact Disc Digital Audio Standard introduced by Philips and Sony, commonly known as "the Red Book," and Compact Disc Recordable (CD-R) Standard introduced by Philips and Sony, commonly known as "the Orange Book, Part II", the optical disc 20 has a diameter of 120 mm (or 80 mm) and a thickness of 1.2 mm. "B" represents the thickness. In addition, there is provided an aperture 21 in the center of the optical disc 20. Around the aperture 21 is a reading zone 25, comprising a storage medium 257 sandwiched between a transparent substrate 259 and a passive layer 253. The data such as audio data, video data and large software systems can be digitally processed as 0's and 1's. Those of ordinary skill in the art are readily aware that the storage medium 257 contain areas of high reflectivity (land) 255 and low reflectivity (pit) 251. When read with a laser, a transition from land to pit or from pit to land represents a "1", and all other areas represents a "0". When one wants to read the data stored in the optical disc 20, all he has to do is insert the optical disc 20 into an optical driver 30. A motor 39 in the optical driver 30 drives the optical disc 20 via the aperture 21. Then, the stored data can be read at a distance "C" between the storage medium 257 and the optical head 32 by using a laser 31 accompanied with a splitter 33, a detector 35, and a transmission device 37.

Conventionally, the optical disc 20 includes memory capacity of 650M bytes, which is more suitable for large software system than a dual mode card 15 having memory capacity of 250K bytes. However, the diameter of such an optical disc is 120 mm and is not as portable as the dual card 15. Therefore, developing a card-shaped compact disc with memory capacity of 50M bytes would be encouraging. Examples are seen in U.S. Pat. No. 6,016,298, entitled "Calling card" (Adivan High Tech AG, Wangen, C H) and in R.O.C. (Taiwan) Pat. No. 374375, entitled "Card-shaped compact disc" (RITEK Corp., TW), as denoted by the device 40 in FIG. 3.

Even though the card-shaped compact disc is convenient for its portability like IC cards and magnetic stripe cards. However, the card-shaped compact disc has a thickness of 1.2 mm (B), while the dual mode card has a thickness of 0.8 mm (A), resulting in a difference of 0.4 mm. Therefore, there is technical difficulty with combining the both advantages of the card-shaped compact disc and the dual mode card; such as convenience for either magnetic stripe or IC chip reading and larger memory capacity accessing.

For example, if a thickness of 1.2 mm (B) is chosen, it is impossible to perform magnetic stripe and IC chip reading in a conventional card reader 11, and thus to read out the recorded data from the magnetic stripe 17 and the IC chip 19. On the contrary, if a thickness of 0.8 mm (A) is chosen, it is impossible for the detector 35 to precisely determine the 0's or 1's stored in the storage medium 257 when a card is inserted into the optical driver 30, because the distance between the storage medium 257 and the optical head 32 is smaller than "C". Based on the theoretical analysis, the depth of the pit 251 is one fourth (¼) of the wavelength of the laser 31. The distance difference allowed is no more than 0.1 mm; otherwise, errors in focusing and tracking may occur and lead to failure in reading data from the optical disc.

Therefore, there is need in providing a novel card for multi-purpose using, combining the functions of a conventional dual mode (magnetic stripe/IC chip) card and a conventional optical disc, so as to achieve advantages such as convenience for either magnetic stripe or IC chip reading and larger memory capacity accessing.

SUMMARY OF THE INVENTION

It is the primary object of the present invention to provide a card for multi-purpose using, employing the thickness of a dual mode (magnetic stripe/IC chip) card so as to comprises a reading zone, a magnetic stripe, and an IC chip so that the card combines the functions of a conventional dual mode (magnetic stripe/IC chip) card and a conventional optical disc so as to achieve advantages such as convenience for either magnetic stripe or IC chip reading and larger memory capacity accessing.

It is another object of the present invention to provide a card for multi-purpose using, employing simplified structure variation so that the card combines the functions of an IC card and an optical disc to simplify the fabrication process.

It is still another object of the present invention to provide a card for multi-purpose using, in which the casing plate fits in with the reading zone of the card so that the reading zone is prevented from being contaminated.

In order to achieve the foregoing objects, the present invention provides a card for multi-purpose using, comprising: a card, comprising at least one reading zone, with a thickness making it able to pass in and out of a card reader; a casing plate, comprising two convex platforms on each side for positioning said card; wherein said casing plate with said positioned card is able to be inserted into an optical driver.

The present invention also provides a card for multi-purpose using, comprising: a card, comprising at least one reading zone; and a casing plate, comprising a transparent loading zone for positioning said card; wherein the thickness of said casing plate with said positioned card is in accordance with the Red Book and the Orange book.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

The present invention providing a card for multi-purpose using, combining the functions of a conventional dual mode (magnetic stripe/IC chip) card and a conventional optical disc so as to achieve advantages such as convenience for both magnetic stripe swiping and IC chip accessing and large memory capacity, can be exemplified by the preferred embodiments as described hereinafter.

Figure 3:
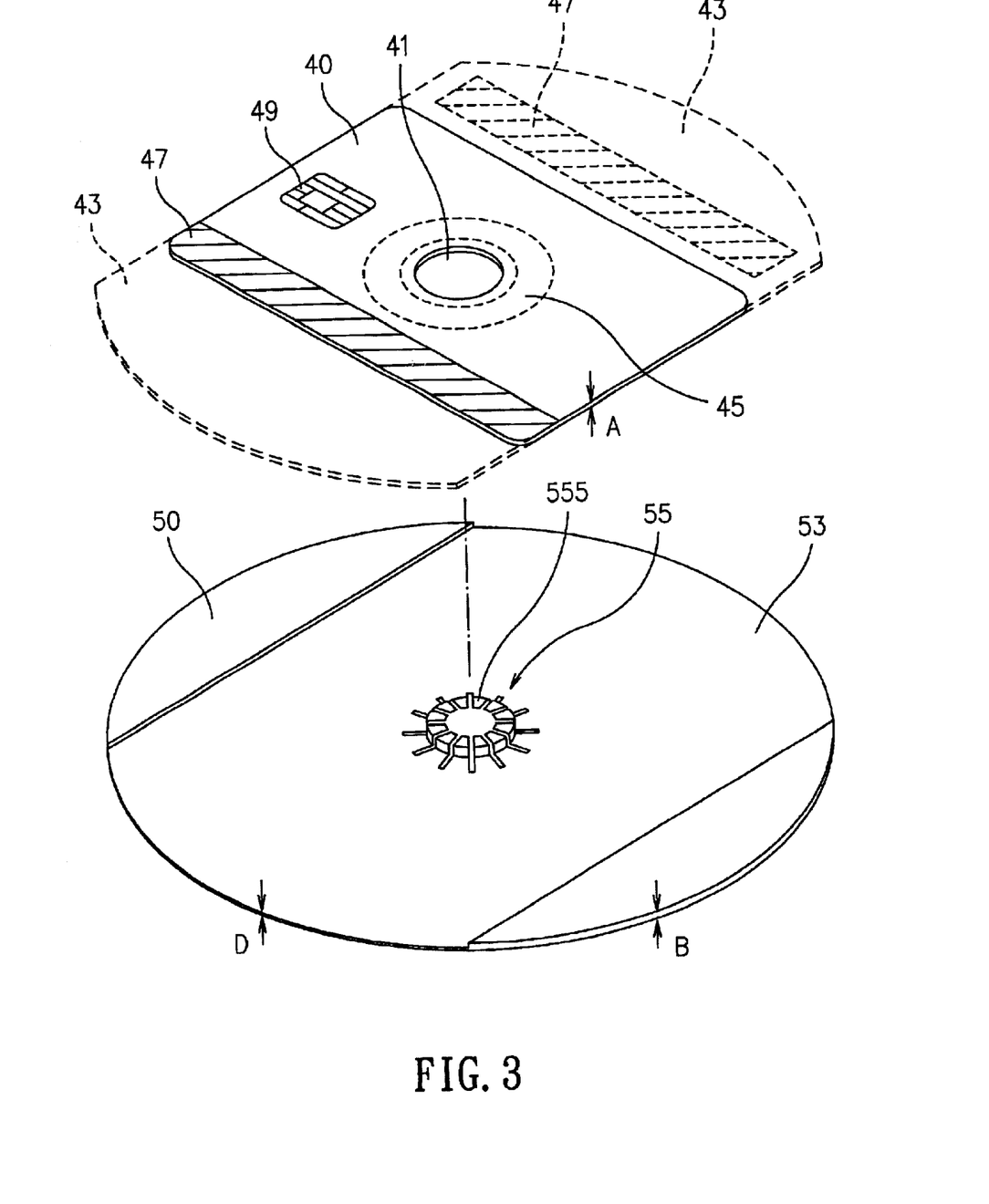
FIG. 3 is a detailed three-dimensional view showing the structure of a card for multi-purpose using in accordance with one embodiment of the present invention.
Figure 4:
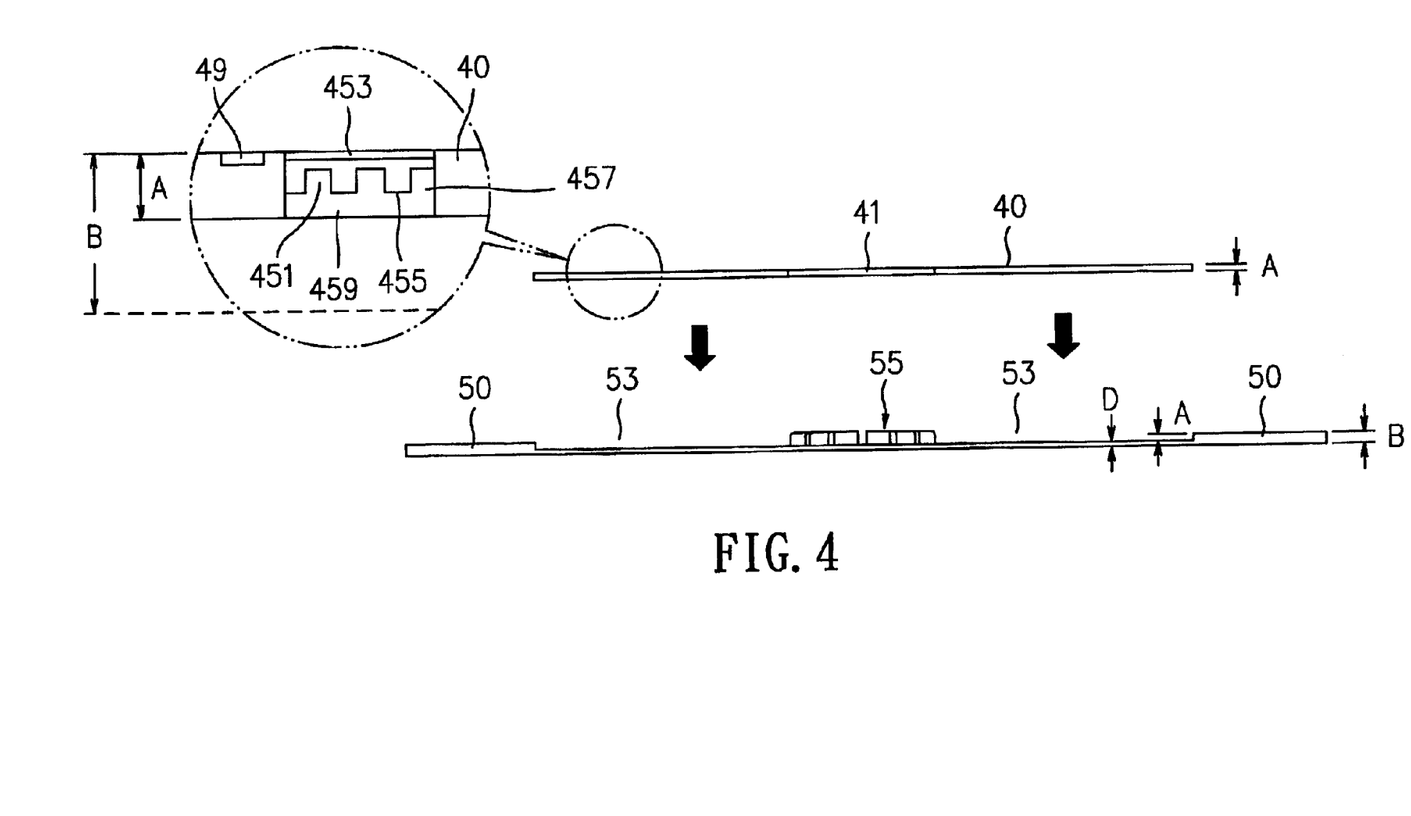
FIG. 4 is a cross-sectional view showing the structure of a card for multi-purpose using as shown in FIG. 3 in accordance with one embodiment of the present invention.

To start with, please refer to FIG. 3 and FIG. 4, which represent a detailed three-dimensional view and a cross-sectional view showing the structure of a card for multi-purpose using in accordance with one embodiment of the present invention. As shown in the drawings, the card according to the present invention comprises: a card 40 and a casing plate 50. The card 40 comprises at least one reading zone such as a magnetic strip 47, an IC chip 49 and a reading area of an optical disc 45 with a thickness of 0.8 mm according to International Standard ISO 7816 (A: 0.76 mm~0.82 mm). Therefore, such a card 40 is able to be read by performing magnetic stripe swiping and/or IC chip accessing in a card reader. There is also provided an aperture 41 in the center of the card 40. Around the aperture 41 is the reading area 45, comprising a storage medium 457 sandwiched between a transparent substrate 459 and a passive layer 453. On the storage medium 457, there are also pits 451 and lands 455. What is different from a conventional optical disc is that the transparent substrate 459 is thinner so that the card 40 can conform to the required thickness of 0.8 mm.

Furthermore, the casing plate 50 comprises a transparent loading zone 53 for positioning the card 40. The thickness of the transparent loading zone 53 is 0.4 mm (D=B−A). In the center of the transparent loading zone 53, there is a positioning member 55 corresponding to the aperture 41 of the card 40. The positioning member 55 has a smooth top surface or a plurality of tooth-shaped units 555 so as to fit in with the aperture 41 of the card 40. Therefore, the card 40 can be stored fixedly in the transparent loading zone 53 of the casing plate 50. When the card 40 is superimposed upon the transparent loading zone 53, the thickness as a whole is 1.2 mm that conforms to Compact Disc Digital Audio Standard described as "the *Red Book*," and Compact Disc Recordable (CD-R) Standard described as "the *Orange Book*, Part II". Associated with the manner, such card can be inserted into and accessed by a conventional optical driver. Moreover, the casing plate 50 can prevent the reading area 45 from being contaminated.

The tooth-shaped units 555 on the top surface of the positioning member 55 can not only fixedly position the card 40 but also helpful to take out the card 40. When someone wants to take the card 40 out from the casing plate 50, he only has to press the tooth-shaped units 555 and the card 40 will flip out, like an optical disc in a disc storage case.

According to the preferred embodiment, the card 40 is a rectangular one. However, it can also be an oval-shaped card with two additional arc-shaped wings 43. In other words, the card 40 and the casing plate 50 can be designed to be rectangular, oval-shaped, circular, annular etc. the magnetic stripe 47, the IC chip 49 and the reading area 45 can designed to be fabricated on the same side or on opposed sides of the card 40.

Figure 5:
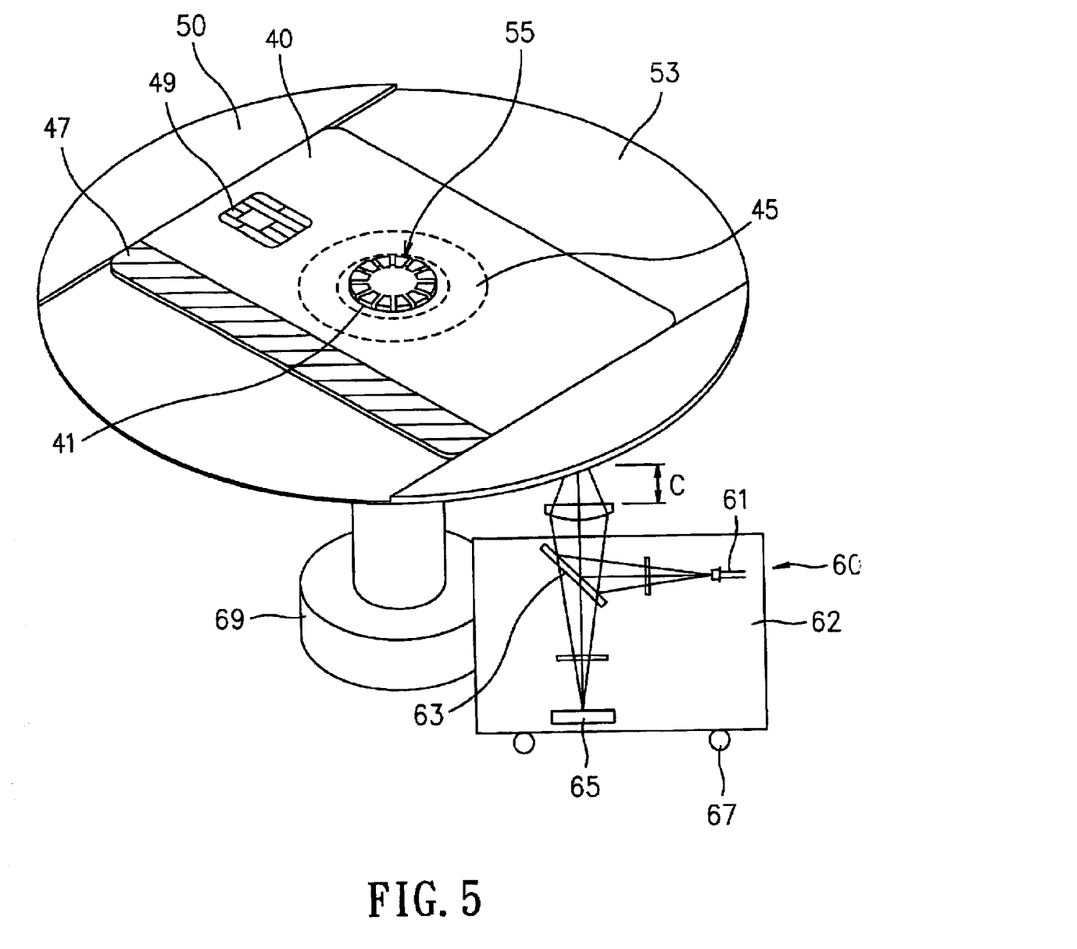
FIG. 5 is a three-dimensional view showing the reading process of a card for multi-purpose using as shown in FIG. 3 in accordance with one embodiment of the present invention.

Please further refer to FIG. 5, which a three-dimensional view showing the reading process of a card for multi-purpose using as shown in FIG. 3 in accordance with one embodiment of the present invention. As shown in the drawing, when one wants to read the data stored in the reading area 45 of the card 40, all he has to do is position the card 40 onto the loading zone 53 of the casing plate 50, and then insert the card as a whole into an optical driver 60. A motor 69 in the optical driver 60 drives the card for multi-purpose using. Then, the stored data can be read at a distance "C" between the storage medium 457 and the optical head 62 by using a laser 61 accompanied with a splitter 63, a detector 65, and a transmission device 67. In this manner, the card for multi-purpose using employs the magnetic stripe 47, the IC chip 49 and the reading area 45 on one card.

Figure 6A:
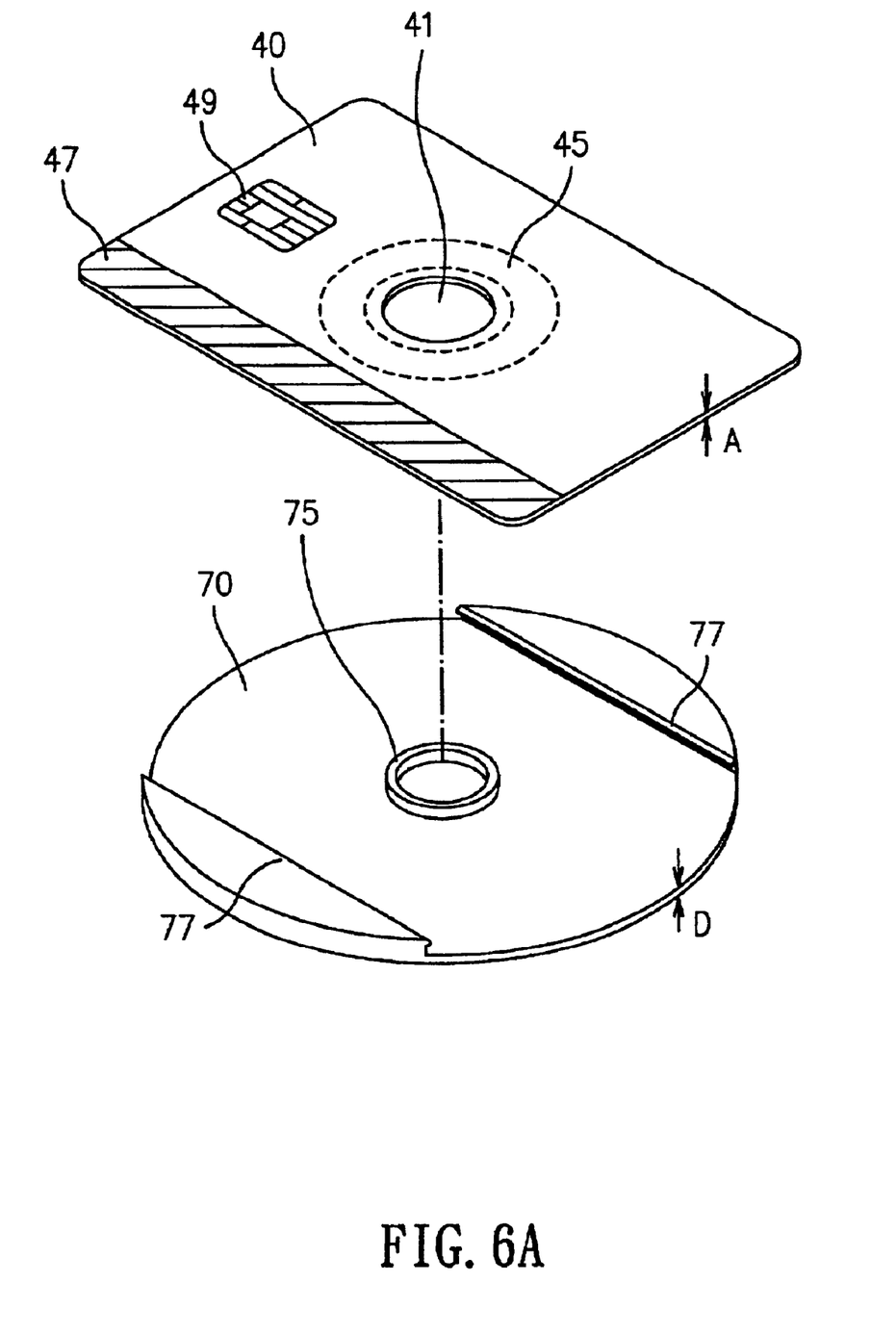
FIG. 6A and FIG. 6B represent a three-dimensional view and a cross-sectional view showing the structure of a card for multi-purpose using in accordance with another embodiment of the present invention.
Figure 6B:
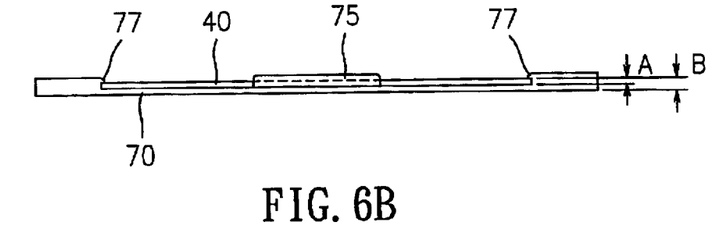

Furthermore, please refer to FIG. 6A and FIG. 6B, which represent a three-dimensional view and a cross-sectional view showing the structure of a card for multi-purpose using in accordance with another embodiment of the present invention. As shown in the drawings, the casing plate 70 is a transparent circular plate with a diameter of 80 mm and a thickness of 0.4 mm (D=B−A). In addition, two convex platforms 77 are provided on each side for positioning the card 40. In the center of the casing plate 70, there is a positioning member 75 corresponding to the aperture 41 of the card 40. The positioning member 55 fits in with the aperture 41 of the card 40. Therefore, the card 40 (with a thickness of A) can be stored fixedly on the casing plate 70 (with a thickness of D) so as to conform to the required thickness of 1.2 mm (B). Therefore, the casing plate 70 with the positioned card 40 is able to be inserted into an optical driver and employs the magnetic stripe 47, the IC chip 49 and the reading area 45 on one card.

Figure 7:
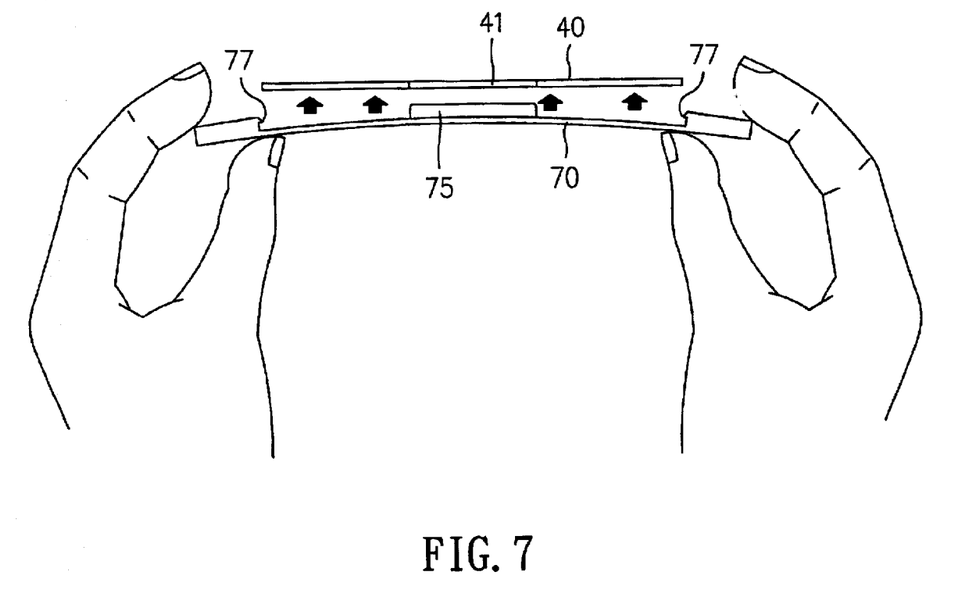
FIG. 7 is a schematic cross-sectional view showing the method for placing a card as shown in FIG. 6A in accordance with the present invention.

At last, please refer to FIG. 7, which is a schematic cross-sectional view showing the method for placing a card as shown in FIG. 6A in accordance with the present invention. As shown in the drawing, the casing plate 70 according to the present invention is made of flexible material so as to facilitate to place the card 40 onto the casing plate 70 and take out the card 40 from the casing plate 70. For example, when one wants to take the card 40 out from the casing plate 70, he only has to push aside the two convex platforms 77 so as to enlarge the distance between the two convex platforms 77 and make the casing plate 70 form a convex. In this manner, the card 40 will flip out.

According to the above discussion, the present invention discloses a novel card for multi-purpose using, combining the functions of a conventional dual mode (magnetic stripe/IC chip) card and a conventional optical disc, so as to achieve advantages such as convenience for both magnetic stripe swiping and IC chip accessing and large memory capacity. Therefore, the present invention has been examined to be progressive, advantageous and applicable to the industry.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A card for multi-purpose using, comprising:
   a card, comprising at least one reading zone, with a thickness allowing said card to pass in and out of a standard magnetic card reader; and
   a casing plate, comprising two convex platforms on each side for positioning said card, a positioning member being formed on said casing plate, said positioning member having one of a smooth top surface and a plurality of tooth-shaped units;
   wherein said casing plate with said positioned card is adapted to be inserted into an optical driver, said card being provided with a reading area, an aperture being formed through the center of said reading area, said aperture being adapted to receive said positioning member.

2. The card as recited in claim 1, wherein said reading zone is one of a magnetic stripe, an IC chip, a reading area of an optical disc and combination thereof.

3. The card as recited in claim 1, wherein the thickness of said casing plate associated with said positioned card is 1.2 mm.

4. The card as recited in claim 1, wherein said casing plate is made of a transparent flexible material.

5. The card as recited in claim 1, wherein the thickness of said card is in accordance with the specification of the ISO 7816.

6. The card as recited in claim 1, wherein the thickness of said card is 0.8 mm and the thickness of said casing plate is 0.4 mm.

7. A card for multi-purpose using, comprising:
   a card, comprising at least one reading zone; and
   a casing plate, comprising a transparent loading zone for positioning said card, a positioning member being formed on said casing plate, said positioning member having one of a smooth top surface and a plurality of tooth-shaped units;
   wherein the thickness of said casing plate associated with said positioned card is 1.2 mm, said card being provided with a reading area, an aperture being formed through the center of said reading area, said aperture being adapted to receive said positioning member.

8. The card as recited in claim 7, wherein said reading zone is one of a magnetic stripe, an IC chip, a reading area of an optical disc and combination thereof.

9. The card as recited in claim 7, wherein the thickness of said disc is in accordance with the specification of the ISO 7816.

10. The card as recited in claim 7, wherein the thickness of said card is 0.8 mm and the thickness of said casing plate is 0.4 mm.

11. The card as recited in claim 7, wherein said casing plate is made of a transparent flexible material.

* * * * *